(12) United States Patent
Matsuda

(10) Patent No.: US 8,973,697 B2
(45) Date of Patent: Mar. 10, 2015

(54) SADDLE-TYPE ELECTRIC VEHICLE

(75) Inventor: Yoshimoto Matsuda, Kobe (JP)

(73) Assignee: Kawasaki Jukogyo Kabushiki Kaisha, Kobe-shi (JP)

(*) Notice: Subject to any disclaimer, the term of this patent is extended or adjusted under 35 U.S.C. 154(b) by 0 days.

(21) Appl. No.: 13/997,176

(22) PCT Filed: Dec. 24, 2010

(86) PCT No.: PCT/JP2010/007479
§ 371 (c)(1),
(2), (4) Date: Jun. 21, 2013

(87) PCT Pub. No.: WO2012/085976
PCT Pub. Date: Jun. 28, 2012

(65) Prior Publication Data
US 2013/0319782 A1    Dec. 5, 2013

(51) Int. Cl.
*B62K 11/00* (2006.01)
*B62K 11/04* (2006.01)
(Continued)

(52) U.S. Cl.
CPC ............. *B62K 11/00* (2013.01); *B62K 11/04* (2013.01); *B62K 2204/00* (2013.01); *B62M 7/04* (2013.01); *B60K 1/04* (2013.01); *B60K 11/06* (2013.01); *B60K 2001/005* (2013.01);
(Continued)

(58) Field of Classification Search
CPC ...... B62K 11/00; B60Y 2200/12; B60K 1/00; B60K 2001/003
USPC ............... 180/220, 219, 291, 298, 230, 65.2, 180/65.6, 69.6, 227, 297; 123/41.72, 185.1; 192/105, 52.1; 474/93, 144, 150
See application file for complete search history.

(56) References Cited

U.S. PATENT DOCUMENTS

| 5,421,427 | A | * | 6/1995 | Ogawa et al. ................. 180/220 |
| 5,460,234 | A | * | 10/1995 | Matsuura et al. ............ 180/65.1 |

(Continued)

FOREIGN PATENT DOCUMENTS

| JP | 04024185 A | 1/1992 |
| JP | 491596 U | 8/1992 |

(Continued)

OTHER PUBLICATIONS

Japanese Patent Office, International Search Report of PCT/JP2010/007479, WIPO, Apr. 5, 2011, 7 pages.

(Continued)

*Primary Examiner* — Joseph Rocca
*Assistant Examiner* — Jacob Knutson
(74) *Attorney, Agent, or Firm* — Alleman Hall McCoy Russell & Tuttle LLP

(57) ABSTRACT

A saddle-type electric vehicle includes a body frame having a head pipe supporting a steering shaft and a main frame portion extending rearward from the head pipe, a battery case provided on the main frame portion behind the head pipe, a battery stored in the battery case and supplying electric power to an electric motor generating traveling power, and a traveling wind path including an inner space of the battery case, wherein a traveling wind inflow port allowing traveling wind to flow in the battery case from front is formed on an upper side of a front portion of the battery case, and a traveling wind outflow port allowing the traveling wind flowing in the battery case to flow out rearward is formed on an upper side of a rear portion of the battery case.

17 Claims, 5 Drawing Sheets

(51) Int. Cl.
  *B62M 7/04* (2006.01)
  *B60K 1/04* (2006.01)
  *B60K 11/06* (2006.01)
  *B60K 1/00* (2006.01)

(52) U.S. Cl.
  CPC .............. *B60Y 2200/12* (2013.01); *B60K 1/00* (2013.01); *B60K 2001/003* (2013.01)
  USPC .......................... 180/220; 123/41.72; 474/93

(56) References Cited

U.S. PATENT DOCUMENTS

| | | | |
|---|---|---|---|
| 6,907,954 B2* | 6/2005 | Tanaka | 180/335 |
| 7,556,115 B2* | 7/2009 | Iwanaga | 180/229 |
| 2007/0089922 A1* | 4/2007 | Iwasaki | 180/219 |
| 2010/0163326 A1* | 7/2010 | Takamura et al. | 180/68.5 |
| 2011/0177371 A1* | 7/2011 | Belton | 429/98 |

FOREIGN PATENT DOCUMENTS

| | | |
|---|---|---|
| JP | 05083863 A | 4/1993 |
| JP | 2545948 Y | 5/1997 |
| JP | 10297570 A | 11/1998 |
| JP | 2900174 B | 6/1999 |
| JP | 2001351653 A | 12/2001 |
| JP | 2003019992 A | 1/2003 |
| JP | 200880986 A | 4/2008 |
| JP | 2009225526 A | 10/2009 |
| JP | 2010195272 A | 9/2010 |
| WO | 2004069638 A1 | 8/2004 |

OTHER PUBLICATIONS

European Patent Office, Extended European Search Report of EP10860985, Apr. 10, 2014, Germany, 7 pages.

* cited by examiner

SADDLE-TYPE ELECTRIC VEHICLE

TECHNICAL FIELD

The present invention relates to a saddle-type electric vehicle such as an electric two-wheeled vehicle driving an electric motor with electric power from a battery to generate traveling power.

BACKGROUND ART

Recently, electric vehicles employing electric motors driven by electric energy stored in batteries as traveling power sources have been developed for the purpose of environmental protection. In such vehicles, since a battery repeats large current charge/discharge by acceleration/deceleration operation of an electric drive motor to produce heat, the battery needs to be suitably cooled. In the case of an electric two-wheeled vehicle, it is known to expose a battery to the outside to be cooled by traveling wind. However, such a battery viewable from the outside deteriorates the design, and therefore is covered with a cover if possible. A configuration has been proposed in which a battery cover covers the battery, and traveling wind is taken in the battery cover from a traveling wind inlet provided on a lower side of the battery cover, so that the battery is cooled (e.g., see Patent Document 1).

PRIOR ART DOCUMENT

Patent Document

Patent Document 1: Japanese Patent Application Laid-open No. 2008-80986

SUMMARY OF THE INVENTION

Problems to be Solved by the Invention

However, when the traveling wind inlet or a traveling wind outlet is provided on the lower side of the battery cover, heat accumulates in an upper region of a battery storage space even though a lower region of the battery storage space is cooled. Although heat radiation is improved if traveling wind is taken in from the lower side of the battery cover to be discharged from the upper side, this increases traveling wind resistance and accordingly high-speed traveling performance is degraded.

An object of the present invention is to effectively cool the drive battery while suppressing traveling wind resistance and improving high-speed traveling performance. Furthermore, a second object is to provide a configuration enabling suitable cooling without heat accumulation additionally when the battery is charging during a travel stop.

Solutions to the Problems

In order to solve the aforementioned problems, a saddle-type electric vehicle according to the present invention includes a body frame having a head pipe supporting a steering shaft and a main frame portion extending rearward from the head pipe, a battery case provided on the main frame portion behind the head pipe, a battery stored in the battery case and supplying electric power to an electric motor generating traveling power, and a traveling wind path including an inner space of the battery case, wherein a traveling wind inflow port allowing traveling wind to flow in the battery case from front is formed on an upper side of a front portion of the battery case, and a traveling wind outflow port allowing the traveling wind flowing in the battery case to flow out rearward is formed on an upper side of a rear portion of the battery case.

According to the aforementioned configuration, during vehicle traveling, traveling wind flows from front in the battery case provided on the main frame portion extending rearward from the head pipe, and cools the battery, and traveling wind exchanging heat with the battery flows out behind the battery case. Moreover, the traveling wind inflow port is formed on the front upper side of the battery case, and the traveling wind outflow port is formed on the rear upper side of the battery case, and hence traveling wind passes to penetrate rearward from front in the upper region of the inner space of the battery case. That is, traveling wind smoothly flows inside the battery case, and hot air collected in the upper region of the battery case is effectively discharged. Therefore, it is possible to effectively cool the battery for traveling drive with a simple configuration while suppressing traveling wind resistance and improving high-speed traveling performance.

The saddle-type electric vehicle may further include a seat arranged behind the battery case, wherein a traveling wind outlet discharging the traveling wind of the traveling wind path outside may be arranged in an under seat space formed below the seat.

According to the configuration, the traveling wind outlet of the traveling wind path is arranged in the under seat space, and hence rainwater or the like can be easily prevented from entering inside the traveling wind path from the traveling wind outlet.

The under seat space may be formed by the seat having a reverse concave cross-section in front view and a cover arranged below the seat and having a concave cross-section in front view, and a size in a vehicle width direction of the cover may be smaller than that of the seat, so that a clearance is formed between the seat and the lower wall portion.

According to the configuration, traveling wind discharged from the traveling wind path to the under seat space passes the clearance between the seat and the cover to go out to the both sides in the vehicle width direction, and hence can more smoothly flow.

The saddle-type electric vehicle may further include an air exhaust duct having a traveling wind communication port connected to the traveling wind outflow port, and the traveling wind outlet opening toward the under seat space, wherein the traveling wind path may further include an inner path of the air exhaust duct, and the air exhaust duct may be arranged on a vehicle upper portion to extend in a forward and rearward direction in side view.

According to the configuration, traveling wind flowing rearward from front in the upper region in the battery case flows to penetrate the air exhaust duct in the forward and rearward direction with no change, and hence can be smoothly discharged.

The saddle-type electric vehicle may further include an inlet duct having a traveling wind inlet arranged in front of the head pipe and introducing traveling wind from outside, and a traveling wind communication port connected to the traveling wind inflow port, wherein the traveling wind path may further include an inner path of the inlet duct.

According to the configuration, the inlet duct having the traveling wind inlet arranged in front of the head pipe is provided, and hence traveling wind from front can be smoothly guided in the battery case arranged behind the head pipe.

The saddle-type electric vehicle may further include an electric-component installation portion provided upstream with respect to the battery in the traveling wind path and an electric component installed on the electric-component installation portion, and electrically connected to the battery.

According to the configuration, the electric component can be cooled by traveling wind prior to cooling of the battery, and can be effectively cooled by traveling wind.

The electric-component installation portion may be provided in a front region between the traveling wind inflow port and the battery in the battery case, and the battery case may be formed such that a flow path area of a region where the electric component is arranged is smaller than that of a region where the battery is arranged.

According to the configuration, the electric component is arranged in the front region with a smaller flow path area in the battery case, and hence the electric component producing heat during vehicle traveling can be effectively cooled by traveling wind with large flow rate.

The electric-component installation portion may be configured by an electric-component installation plate protruding rearward from an inner surface of the battery case near the traveling wind inflow port, and the battery case may be formed such that a size in the vehicle width direction of the region where the electric component is arranged is smaller than that of the region where the battery is arranged, in plan view.

According to the configuration, the electric-component installation plate is arranged to partition a region right behind the traveling wind inflow port in the inner space of the battery case vertically, and hence the size in the height direction of the region where the electric component is arranged is reduced, and the battery case is formed to reduce the size in the vehicle width direction of the region where the electric component is arranged. Accordingly, the flow path area of the region where the electric component is arranged can be easily and sufficiently reduced. Moreover, since the battery case can be downsized near the head pipe, handling of the handle can be facilitated.

The saddle-type electric vehicle may further include an opening/closing cover closing to cover an upper wall portion defining a part of the inner space of the battery case from above, and a connector for battery charge exposing outside by opening the opening/closing cover, wherein the upper wall portion may be provided with a heat radiation hole capable of discharging air in the inner space outside.

According to the configuration, heat produced from the battery when the opening/closing cover is opened and the battery is being charged can be discharged from the heat radiation hole exposed outside by opening the opening/closing cover.

The saddle-type electric vehicle may further include a fan accommodated in the battery case, and arranged below the battery.

According to the configuration, wind fed from the fan inhibits air from stagnating below the battery in the battery case, and hence hot air in the battery case can be more effectively discharged.

The saddle-type electric vehicle may further include a fan control device operating the fan when the battery is being charged.

According to the configuration, when the vehicle stops traveling and the battery is being charged, the fan operates, and hence heat can be suitably discharged even when the battery produces heat with no traveling wind by charging.

Effects of the Invention

As seen in the aforementioned description, according to the present invention, it is possible to effectively cool the battery for traveling drive with a simple configuration while suppressing traveling wind resistance and improving high-speed traveling performance.

EMBODIMENTS OF THE INVENTION

Hereinafter, embodiments according to the present invention will be described with reference to the drawings. A concept of a direction used in the following description is based on a direction viewed from a driver riding an electric two-wheeled vehicle. The present invention is applied to an electric two-wheeled vehicle in this embodiment, but applicable to an ATV (All Terrain Vehicle) or the like in a case of a saddle-type electric vehicle traveling with power by an electric motor, driven while being straddled by a driver.

Figure 1:
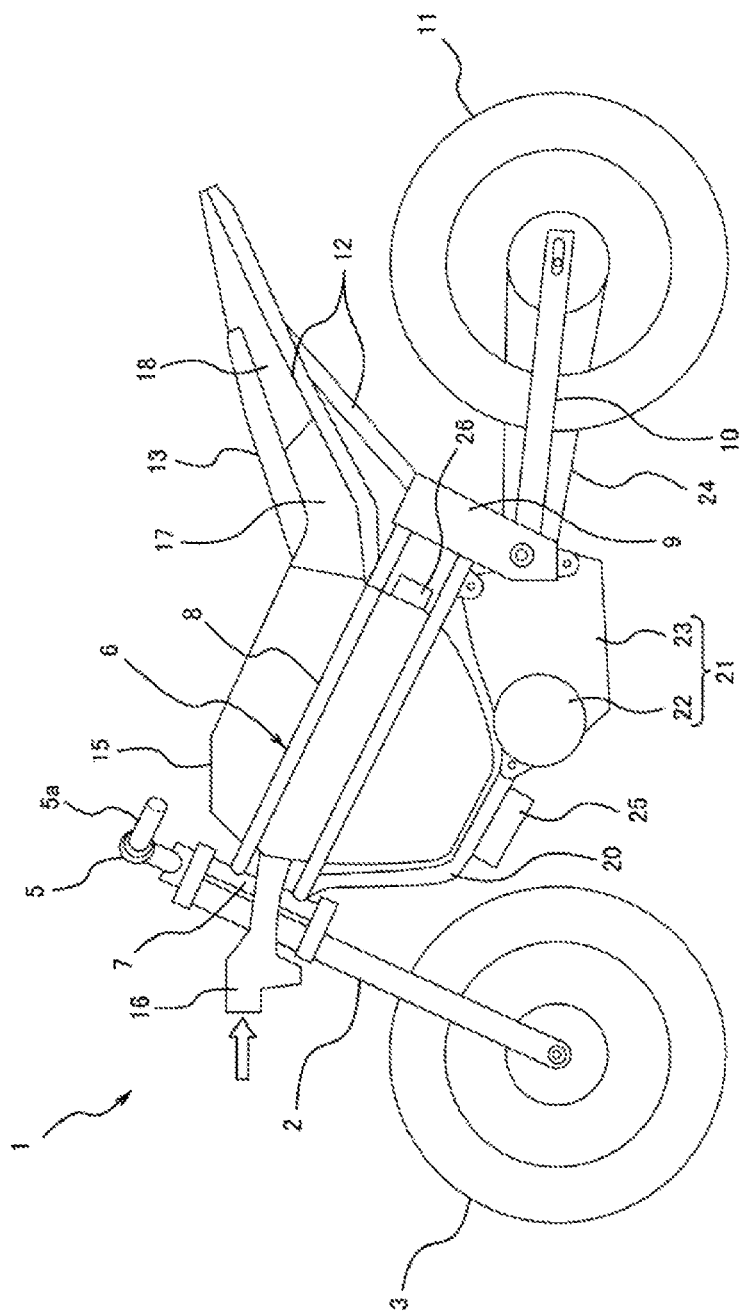
FIG. 1 is a left side view of an electric two-wheeled vehicle according to an embodiment of the present invention.

FIG. 1 is a left side view of an electric two-wheeled vehicle 1 according to an embodiment of the present invention. As shown in FIG. 1, the electric two-wheeled vehicle 1 includes no internal-combustion engine, and travels by rotating a rear wheel 11 with power from an electric motor 22. The electric two-wheeled vehicle 1 includes a front fork 2 provided substantially vertically at a predetermined caster angle, and a front wheel 3 as a driven wheel is rotatably supported on a lower portion of the front fork 2. A steering shaft 4 (see FIG. 3) has a lower portion connected to an upper portion of the front fork 2, and an upper portion mounted with a bar-type handle 5. In the handle 5, an accelerator grip 5a is provided on a portion gripped by a right hand of a driver. The steering shaft 4 (see FIG. 3) is rotatably inserted into a head pipe 7 configured in a body frame 6, and the driver steers the front wheel 3 by rotating the handle 5.

The body frame 6 includes the head pipe 7, and a pair of right and left and a pair of upper and lower main frame portions 8 extending rearward while slightly inclining downward from the head pipe 7. Rear portions of the main frame portions 8 are connected to a pair of right and left pivot frame portions 9. A front portion of a swing arm 10 extending in a substantially forward and rearward direction pivots on the pivot frame portions 9, and a rear wheel 11 as a drive wheel is rotatably supported on a rear portion of the swing arm 10. A seat frame portion 12 supporting a seat 13 for driver's riding is connected to the main frame portions 8 and the pivot frame portions 9.

A battery case 15 storing a plurality of batteries 27 (see FIG. 2) is arranged between the pair of right and left main frame portions 8, and this battery case 15 is fixed to the main frame portions 8. The battery case 15 is arranged to overlap the main frame portions 8 in side view, and the main frame portions 8 are located on a center in a height direction of the battery case 15 in side view.

An inlet duct 16 for taking in traveling wind from front and guiding the traveling wind into battery case 15 is provided in front of the battery case 15 and near the head pipe 7, a rear end of the inlet duct 16 is connected to a front upper portion of the battery case 15. An air exhaust duct 17 for discharging traveling wind that passes the battery case 15 in the rearward direction is provided behind the battery case 15 and below the seat 13, and a front end of the air exhaust duct 17 is connected to a rear upper portion of the battery case 15. A cover 18 forming an under seat space 54 (see FIG. 2) is provided behind the air exhaust duct 17 and below the seat 13.

The body frame 6 includes a down frame portion 20 inclining from the head pipe 7 below the main frame portions 8, and extending along a lower side of the battery case 15. An electric motor unit 21 is fixed to a rear end of the down frame portion 20, and the electric motor unit 21 is fixed to the main frame portions 8 and the pivot frame portions 9. That is, the main frame portions 8 and the pivot frame portions 9 are connected to the down frame portion 20 through the electric motor unit 21, and the electric motor unit 21 configures a part of the body frame 6. The electric motor unit 21 is arranged below the main frame portions 8 and the battery case 15 and in front of the pivot frame portions 9. The electric motor unit 21 has an electric motor 22 generating traveling drive power, and a transmission 23 provided integrally with a rear portion of the electric motor. The down frame portion 20 is mounted with an inverter 25 in front of the electric motor unit 21, and a rear portion of the battery case 15 is mounted with a controller 26. Then, electric power from the batteries 27 (see FIG. 2) is supplied to the electric motor 22 through the inverter 25, and the electric motor 22 generates rotative power. The generated rotative power is changed in speed by the transmission 23 and transmitted to the rear wheel 11 through a chain 24.

Figure 2:
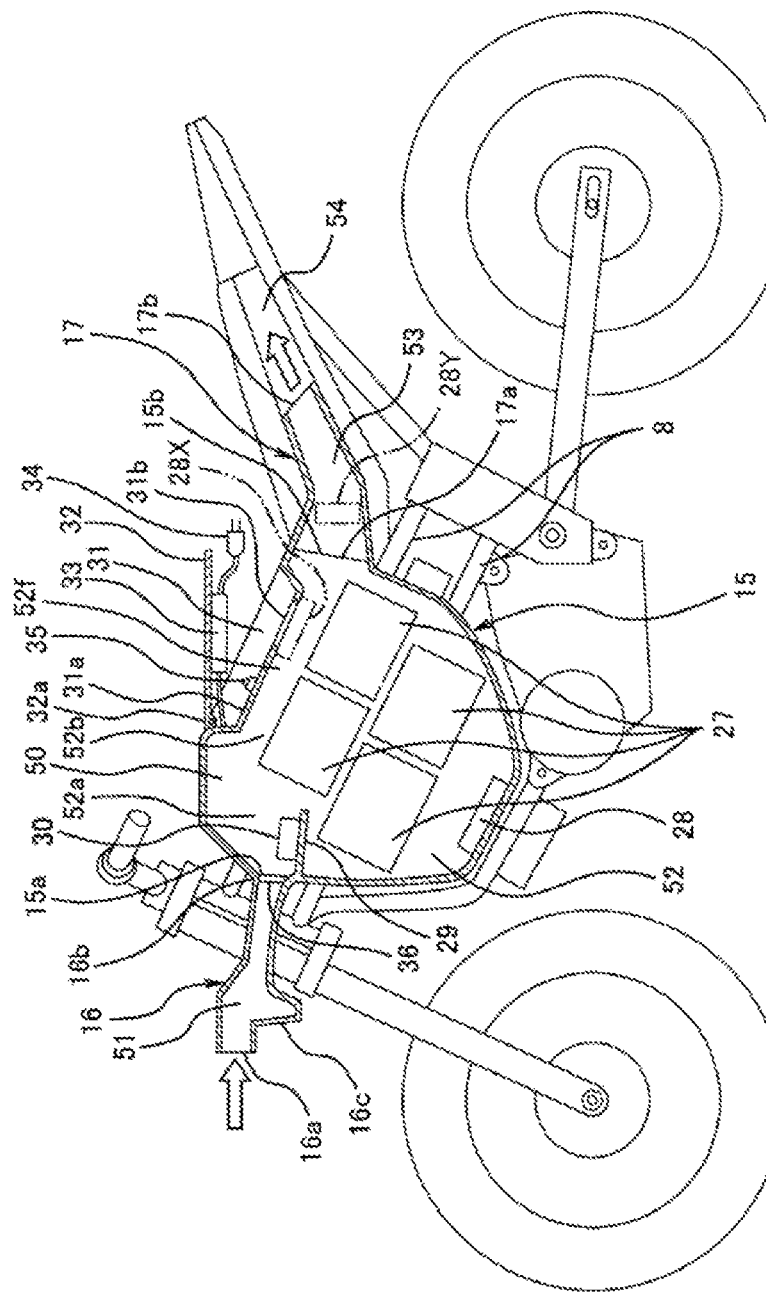
FIG. 2 is a left side view including a main portion of the electric two-wheeled vehicle shown in FIG. 1 in section.

FIG. 2 is a left side view including a main portion of the electric two-wheeled vehicle 1 shown in FIG. 1 in section. As shown in FIG. 2, the inlet duct 16, the battery case 15 and the air exhaust duct 17 form a traveling wind path 50 through which traveling wind generated during traveling of the electric two-wheeled vehicle 1 passes rearward from front. The inlet duct 16 has an inner path 51 extending in a forward and rearward direction, and is arranged such that a middle portion is curved to bypass the head pipe 7. The head pipe 7 may air-tightly penetrate the inlet duct vertically. A traveling wind inlet 16*a* opening forward is provided on a front end of the inlet duct 16, and is located in front of the head pipe 7. A traveling wind communication port 16*b* on a rear end of the inlet duct 16 is communicated with a traveling wind inflow port 15*a* on the front upper portion of the battery case 15.

The inlet duct 16 has an auxiliary chamber 16*c* swelling below at the middle portion in the forward and rearward direction. An area of a flow path section where the auxiliary chamber 16*c* exists is larger than those of the traveling wind inlet 16*a* and the traveling wind communication port 16*b*, and is twice or more in this embodiment. Thus, the auxiliary chamber 16*c* partially expanding the flow path sectional area exists, thereby reducing a flow rate of the air in the inner path 51 once and easily trapping rain or dust from outside in the auxiliary chamber 16*c*. The auxiliary chamber 16*c* is provided with a drain hole (not shown).

The traveling wind inflow port 15*a* allowing traveling wind to flow in the battery case 15 from front is formed on an upper side of a front wall portion of the battery case 15. A traveling wind outflow port 15*b* allowing traveling wind flowing in the battery case 15 to flow rearward is formed on an upper side of a rear wall portion of the battery case 15. The traveling wind inflow port 15*a* is located in front of centers in the forward and rearward direction of the main frame portions 8 in side view, and the traveling wind outflow port 15*b* is located behind the centers in the forward and rearward direction of the main frame portions 8 in side view. The traveling wind inflow port 15*a* is arranged to be lower than the upper end of the head pipe 7 and higher than the lower end of the head pipe 7. The traveling wind outflow port 15*b* is arranged at such a position as to be higher than a height center of portions, which are located in the same forward and rearward direction as the traveling wind outflow port 15*b* in the pair of upper and lower main frame portions 8, and as to be lower than the seat 13.

A filter 36 made of non-woven fabric and the like is arranged on the traveling wind inflow port 15*a* of the battery case 15 to catch foreign matter, rainwater or the like included in traveling wind flowing in an inner space 52 of the battery case 15 from the inlet duct 16. The plurality of batteries 27 (8 in this example) are arranged on the top, bottom, front, and rear in the inner space 52 of the battery case 15. The batteries 27 are positioned by a bracket (not shown) in the battery case 15.

An electric-component installation plate protruding rearward from near an underside of the traveling wind inflow port 15*a* of the front wall portion of the battery case 15 is provided as an electric-component installation portion 29 in the battery case 15. An electric component 30 electrically connected to the batteries 27 and producing heat during operation is installed on the electric-component installation portion 29. The electric-component installation portion 29 is provided on a front region 52*a* between the traveling wind inflow port 15*a* and the batteries 27, so that the electric component 30 is arranged upstream with respect to the batteries 27 in the traveling wind path 50.

No traveling wind inflow port or traveling wind outflow port communicated with the inlet duct 16 or the air exhaust duct 17 are provided on a lower half portion of the battery case 15. That is, in the inner space 52 of the battery case 15, the lower region is a convection zone, and the upper region is a traveling wind passing zone. In the inner space 52 of the battery case 15, a fan 28 is stored below the batteries 27. While hot air naturally moves upward in the inner space of the battery case 15, heat existing below the batteries 27 can be diffused and more suitably let out upward by driving the fan 28.

As a modification, the fan 28 may be provided near a heat radiation hole 31*b* (28X in FIG. 2) of an opening/closing cover 32 on an upper side of the battery case 15, or in the air exhaust duct 17 (28Y in FIG. 2). In these cases, fans having functions of allowing wind to flow outward from the battery case 15 are used as the fans 28X, 28Y.

An upper wall portion of the battery case 15 forms a traveling wind exclusive path 52*f* with a void between the batteries 27 stored in the inner space 52 and the upper wall portion. The upper wall portion of the battery case 15 is formed with a concavity 31 opening upward, and provided with an opening/closing cover 32 to cover the concavity 31. The opening/closing cover 32 has a front end 32*a* rotatably mounted on the battery case 15. A connector for battery charge 34 and an AC/DC converter 33 are stored in concavity 31, and the AC/DC converter 33 is connected to the batteries 27 through an electric wire. The connector for battery charge may be a connector for a quick charge. The connector for battery charge 34 is exposed to the outside by opening the opening/closing cover 32. An opening/closing detection switch 35 detecting an opening/closing state of the opening/closing cover 32 is provided on a bottom wall portion 31*a* of the concavity 31. The heat radiation hole 31b capable of discharging air in the inner space 52 of the battery case 15 outside is formed on the bottom wall portion 31a of the concavity 31. The bottom wall portion 31a of the concavity 31 and the opening/closing cover 32 in a closing state are provided to incline downward such that rear portions are located at lower positions. Therefore, when lifting a rear end of the opening/closing cover 32 to open, the opening/closing cover 32 is located above the heat radiation hole 31b.

A traveling wind communication port 17a on a front end of the air exhaust duct 17 is connected to the traveling wind outflow port 15b of the battery case 15. The air exhaust duct 17 has an inner path 53 extending in the forward and rearward direction. The air exhaust duct 17 inclines slightly upward such that a rear portion thereof extends along the seat 13. A traveling wind outlet 17b opening rearward is provided on the rear end of the air exhaust duct 17, and is communicated with the under seat space 54 formed below the seat 13. Consequently, rainwater or the like is prevented from mixing from the traveling wind outlet 17b in the air exhaust duct 17.

The traveling wind path 50 is formed by the inner path 51 of the inlet duct 16, the upper region of the inner space 52 of the battery case 15, and an inner space 53 of the air exhaust duct 17, and is formed above the height center of the electric two-wheeled vehicle 1 to extend in the forward and rearward direction in side view. Traveling wind flowing in from the traveling wind inlet 16a flows through the inlet duct 16, the battery case 15 and the air exhaust duct 17 in this order to discharge outside from the under seat space 54.

Figure 3:
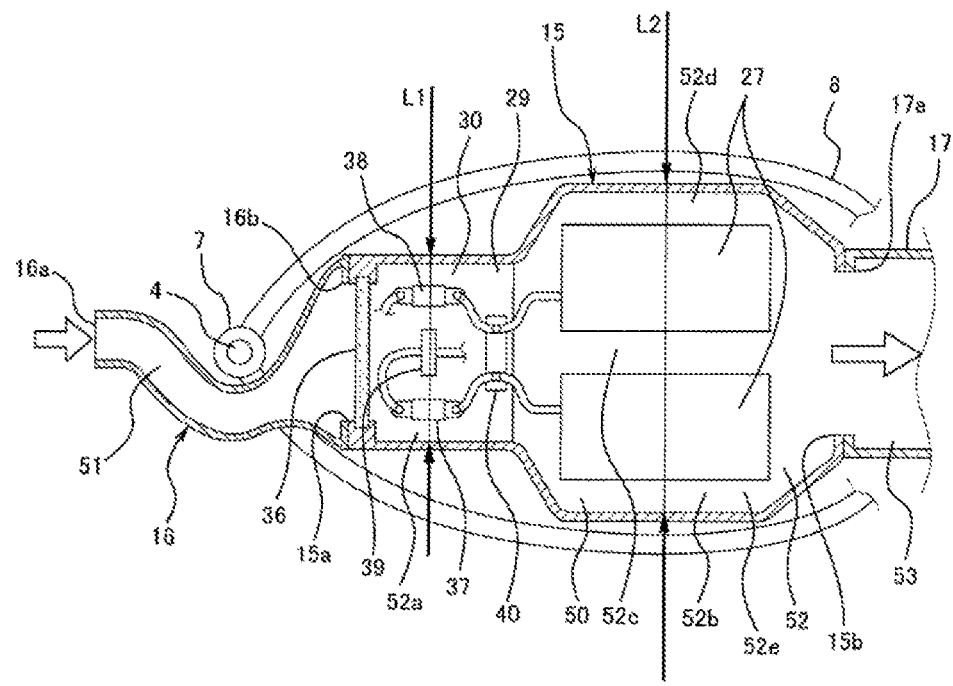
FIG. 3 is a horizontal sectional view of the main portion of the electric two-wheeled vehicle in FIG. 2.
Figure 4:
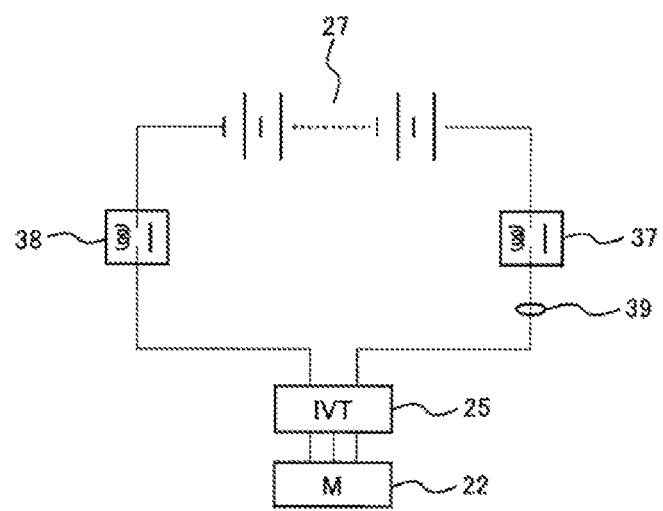
FIG. 4 is a circuit diagram of an electric system including electric components shown in FIG. 3.

FIG. 3 is a horizontal sectional view of the main portion of the electric two-wheeled vehicle 1 shown in FIG. 2. FIG. 4 is a circuit diagram of an electric system including electric component 30 shown in FIG. 3. As shown in FIGS. 3 and 4, the inlet duct 16 has the traveling wind inlet 16a located in front of the head pipe 7, and the traveling wind communication port 16b located behind the head pipe 7 and curved to bypass a lateral of the head pipe 7. The electric-component installation portion 29 is provided in the front region 52a of the battery case 15, and the batteries 27 are arranged right and left in a battery storage region 52b on a rear side of the front region 52a. The right and left batteries 27 form a traveling wind exclusive path 52c with a void serving as a central path therebetween. The right and left batteries 27 and right and left sidewalls of the battery case 15 form traveling wind exclusive paths 52d, 52e with voids therebetween.

The electric-component installation portion 29 is installed with a terminal block 40, and the electric component 30 connected to the batteries 27 through high pressure electric wires connected to the terminal block 40. The electric component 30 includes relays 37, 38 provided on a circuit connecting the batteries 27 and the inverter 25, and a current sensor 39 detecting a value of a current flowing on the circuit (see FIG. 4). The relays 37, 38 and the current sensor 39 produce heat to become hot during traveling.

The battery case 15 is formed such that a size L1 of a vehicle width direction of the region 52a where the electric component 30 is arranged is smaller than a size L2 in a vehicle width direction of the region 52b where the batteries 27 are arranged, in plan view. Consequently, in the battery case 15, a flow path area of the region 52a where the electric component 30 is arranged is smaller than that of the region 52b where the batteries 27 are arranged.

Figure 5:
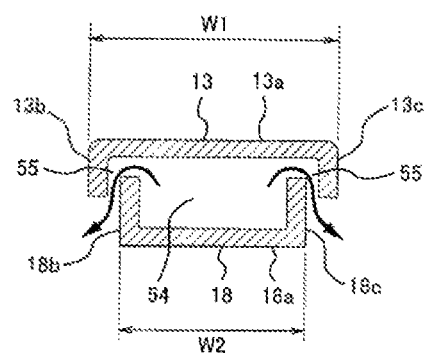
FIG. 5 is a sectional view of a under seat space shown in FIG. 2, as viewed from front.

FIG. 5 is a sectional view of the under seat space 54 shown in FIG. 2, as viewed from front. As shown in FIG. 5, the under seat space 54 is formed by the seat 13, and the cover 18 arranged below the seat 13. The seat 13 has an upper wall portion 13a, and sidewall portions 13b, 13c protruding downward from right and left ends thereof and having a reverse concave cross-section in front view. The cover 18 has a lower wall portion 18a, and sidewall portions 18b, 18c protruding upward from right and left ends thereof and having a reverse concave cross-section in front view. A size W2 in the vehicle width direction of the cover 18 is smaller than a size W1 in the vehicle width direction of the seat 13. The sidewall portions 13b, 13c of the seat 13 and the sidewall portions 13b, 13c of the cover 18 overlap to have clearances 55 therebetween. That is, air of the under seat space 54 is discharged from the right and left clearances 55 to outside in the vehicle width direction.

Figure 6A:
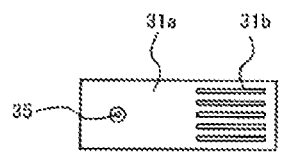
FIG. 6A is a plan view for illustrating a heat radiation hole of a battery case shown in FIG. 2.
Figure 6B:
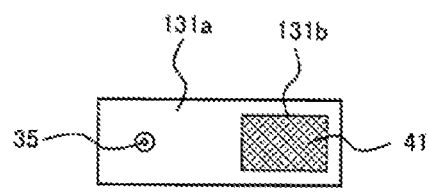
FIG. 6B is a plan view for illustrating a modification of a heat radiation hole of a battery case shown in FIG. 2.

FIG. 6A is a plan view for illustrating the heat radiation hole 31b of the battery case 15 shown in FIG. 2. FIG. 6B is a plan view for illustrating a modification of a heat radiation hole 131b of the battery case 15 shown in FIG. 2. As shown in FIG. 6A, heat radiation holes 31b configured by a plurality of slits are formed on the bottom wall portion 31a of the concavity 31(see FIG. 2) of the battery case 15. That is, heat produced from the batteries 27 when charged with the opening/closing cover 32 (see FIG. 2) opened passes through the heat radiation hole 31b to go upward, thereby exerting radiation effects. Moreover, the heat radiation holes 31b are formed in slit-shapes, thereby preventing foreign matters from entering from outside in the battery case 15. As a modification of the heat radiation hole, as shown in FIG. 6B, the heat radiation hole 131b covered with a mesh 41 may be provided on a bottom wall portion 131a of the concavity provided on the upper wall portion of the battery case 15.

Figure 7:
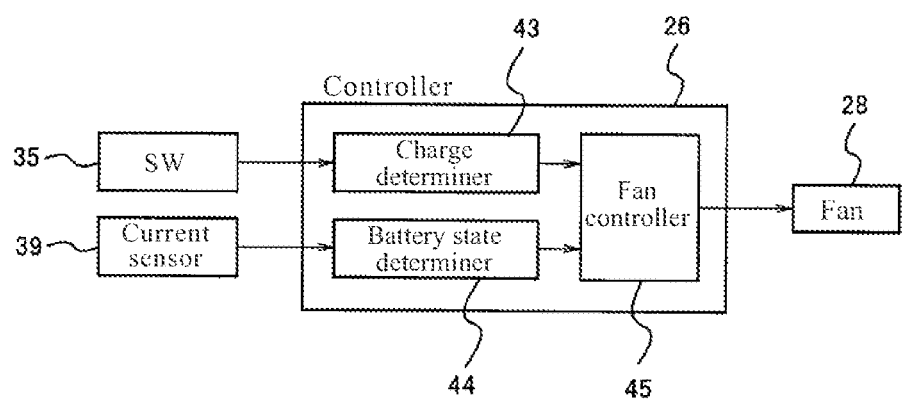
FIG. 7 is a block diagram for illustrating fan control of the electric two-wheeled vehicle shown in FIG. 2.

FIG. 7 is a block diagram for illustrating fan control of the electric two-wheeled vehicle 1 shown in FIG. 2. As shown in FIG. 7, the opening/closing detection switch 35 and the current sensor 39 are connected on an input side of the controller 26, and a fan 28 is connected on an output side of the controller 26. The controller 26 has a charge determiner 43, a battery state determiner 44 and a fan controller 45. The charge determiner 43 determines from a signal from the opening/closing detection switch 35 whether the batteries 27 are being charged. Specifically, when receiving the signal that the opening/closing cover 32 is opened from the opening/closing detection switch 35, the charge determiner 43 determines that the batteries 27 are being charged. When receiving the signal that the opening/closing cover 32 is closed from the opening/closing detection switch 35, the charge determiner 43 determines that the batteries 27 are not being charged.

The battery state determiner 44 determines a heat generation state of the batteries 27 from a signal from the current sensor 39. Specifically, when the current value detected by the current sensor 39 is a predetermined threshold value or more, the battery state determiner 44 determines that the batteries are in a battery high heat generation state. When the current value detected by the current sensor 39 is less than the predetermined threshold value, the battery state determiner 44 determines that the batteries are in a battery low heat generation state. When the charge determiner 43 determines that the batteries are being charged, and the battery state determiner 44 determines that the batteries are in the battery high heat generation state, the fan controller 45 controls the fan 28 to drive. Otherwise, the fan controller 45 controls the fan 28 to stop.

According to the aforementioned configuration, during traveling of the electric two-wheeled vehicle 1, traveling wind flows in the battery case 15 from front to cool the batteries 27, and traveling wind exchanging heat with the batteries 27 flows out behind the battery case 15. Moreover, the traveling wind inflow port 15a is formed on the front upper side of the battery case 15, and the traveling wind outflow port 15b is formed on the rear upper side of the battery case 15, and hence traveling wind passes to penetrate rearward from front in the upper region of the inner space 52 of the battery case 15. That is, traveling wind smoothly flows inside the battery case 15, and hot air collected in the upper region of the battery case 15 is effectively discharged. Therefore, the batteries for traveling drive can be effectively cooled with a simple configuration while suppressing traveling wind resistance and improving high-speed traveling performance.

Furthermore, the traveling wind exclusive paths 52c to 52f where the batteries 27 are not arranged are provided on the upper portion of the battery case 15. Consequently, traveling wind flowing in the battery case 15 from the traveling wind inflow port 15a passes the traveling wind exclusive paths 52c to 52f to flow out of the traveling wind outflow port 15b, and hence flows extremely smoothly. The inlet duct 16 having the traveling wind inlet 16a arranged in front of the head pipe 7 is provided, and hence traveling wind from front is smoothly guided in the battery case 15 arranged behind the head pipe 7. Traveling wind flowing rearward from the battery case 15 flows to penetrate the air exhaust duct 17 in the forward and rearward direction with no change, and hence is smoothly discharged. Accordingly, resistance by traveling wind flowing through the traveling wind path 50 can be sufficiently suppressed.

The traveling wind outlet 17b of the traveling wind path 50 is arranged in the under seat space 54, and hence rainwater or the like can be easily prevented from entering inside the traveling wind path 50 from the traveling wind outlet 17b. Moreover, traveling wind discharged from the traveling wind path 50 to the under seat space 54 passes the clearances 55 between the seat 13 and the cover 18 to go out to the both sides in the vehicle width direction, and hence can flow more smoothly.

The electric component 30 producing heat during traveling is provided on the electric-component installation portion 29 located upstream of the batteries 27, and hence can be effectively cooled by traveling wind prior to cooling of the batteries 27. Moreover, the electric-component installation portion 29 is arranged to partition the inner space 52 of the battery case 15 vertically, and hence the size in the height direction of the region 52a where the electric component 30 is arranged is reduced, and the battery case 15 is formed to reduce the size L1 in the vehicle width direction of the region 52a where the electric component 30 is arranged. Accordingly, the flow path area of the region 52a where the electric component 30 is arranged, in the battery case 15, is reduced, and the electric component 30 producing heat during traveling of the electric two-wheeled vehicle 1 can be effectively cooled by traveling wind with large flow rate. Furthermore, since a portion right behind the head pipe 7 in the battery case 15 is reduced in size, handling of the handle 5 can be facilitated.

Heat produced from the batteries 27 when the opening/closing cover 32 is opened and the batteries 27 are being charged can be discharged from the heat radiation hole 31b exposed outside by opening the opening/closing cover 32. Moreover, when the electric two-wheeled vehicle 1 stops traveling and the batteries 27 are being charged, the fan 28 operates, and hence heat can be suitably discharged from the heat radiation hole 31b even when the batteries 27 produce heat with no traveling wind by charging.

While the inlet duct 16 and/or the air exhaust duct 17 are connected to the battery case 15 in the aforementioned embodiment, the traveling wind inflow port 15a of the battery case 15 may be an inlet introducing traveling wind from outside, or the traveling wind outflow port 15b of the battery case 15 may be an outlet discharging traveling wind outside.

While the separate inlet duct 16 and/or air exhaust duct 17 are connected to the battery case 15 in the aforementioned embodiment, the inlet duct 16 and/or the air exhaust duct 17 may be integrally formed with the battery case 15.

The present invention is not limited to the aforementioned respective embodiments, and configurations thereof can be modified, added or deleted without departing from the gist of the invention. The aforementioned respective embodiments may be voluntarily combined, and for example, a part of a configuration or a method in one embodiment may be applied to other embodiment.

INDUSTRIAL APPLICABILITY

As described above, the saddle-type electric vehicle according to the present invention has an excellent effect enabling effective cooling of the battery for traveling drive with a simple configuration while suppressing traveling wind resistance, and improving high-speed traveling performance, and is useful when widely applied to saddle-type electric vehicles such as electric two-wheeled vehicles, capable of exerting significance of this effect.

REFERENCE CHARACTERS LIST

1: ELECTRIC TWO-WHEELED VEHICLE
4: STEERING SHAFT
6: BODY FRAME
7: HEAD PIPE
8: MAIN FRAME PORTION
13: SEAT
15: BATTERY CASE
15a: TRAVELING WIND INFLOW PORT
15b: TRAVELING WIND OUTFLOW PORT
16: INLET DUCT
16a: TRAVELING WIND INLET
16b: TRAVELING WIND COMMUNICATION PORT
17: AIR EXHAUST DUCT
17a: TRAVELING WIND COMMUNICATION PORT
17b: TRAVELING WIND OUTLET
22: ELECTRIC MOTOR
27: BATTERY
28: FAN
29: ELECTRIC-COMPONENT INSTALLATION PORTION
30: ELECTRIC COMPONENT
32: OPENING/CLOSING COVER
34: CONNECTOR FOR BATTERY CHARGE
31b, 131b: HEAT RADIATION HOLE
45: FAN CONTROLLER
50: TRAVELING WIND PATH
54: UNDER SEAT SPACE

The invention claimed is:
1. A saddle-type electric vehicle comprising:
a body frame having a head pipe supporting a steering shaft and a main frame portion extending rearward from the head pipe;
a battery case provided on the main frame portion behind the head pipe;
a battery stored in the battery case and supplying electric power to an electric motor generating traveling power;
a traveling wind path including an inner space of the battery case;
an electric-component installation portion provided upstream with respect to the battery in the traveling wind path; and an electric component installed on the electric-component installation portion, and electrically connected to the battery, wherein a traveling wind inflow port allowing traveling wind to flow in the battery case from front is formed on an upper side of a front portion of the battery case, and a traveling wind outflow port allowing the traveling wind flowing in the battery case to flow out rearward is formed on an upper side of a rear portion of the battery case.

2. The saddle-type electric vehicle according to claim 1, further comprising a seat arranged behind the battery case, wherein a traveling wind outlet discharging the traveling wind of the traveling wind path outside is arranged in an under seat space formed below the seat.

3. The saddle-type electric vehicle according to claim 1, further comprising an inlet duct having a traveling wind inlet arranged in front of the head pipe and introducing traveling wind from outside, and a traveling wind communication port connected to the traveling wind inflow port, wherein the traveling wind path further includes an inner path of the inlet duct.

4. The saddle-type electric vehicle according to claim 1, wherein the electric-component installation portion is provided in a front region between the traveling wind inflow port and the battery in the battery case, and the battery case is formed such that a flow path area of a region where the electric component is arranged is smaller than that in a region where the battery is arranged.

5. The saddle-type electric vehicle according to claim 4, wherein the electric-component installation portion is configured by an electric-component installation plate protruding rearward from an inner surface of the battery case near the traveling wind inflow port, and the battery case is formed such that a size in the vehicle width direction of the region where the electric component is arranged is smaller than that of the region where the battery is arranged, in a plan view.

6. The saddle-type electric vehicle according to claim 1, further comprising:

an opening/closing cover closing to cover an upper wall portion defining a part of the inner space of the battery case from above; and a connector for battery charge exposing outside by opening the opening/closing cover, wherein the upper wall portion is provided with a heat radiation hole capable of discharging air of the inner space outside.

7. The saddle-type electric vehicle according to claim 1, further comprising a fan accommodated in the battery case, and arranged below the battery.

8. The saddle-type electric vehicle according to claim 7, further comprising a fan control device operating the fan when the battery is being charged.

9. The saddle-type electric vehicle according to claim 1, further comprising a connector for charging the battery when the vehicle stops traveling.

10. The saddle-type electric vehicle according to claim 1, wherein the traveling wind inflow port is arranged to be higher than a lower end of the head pipe.

11. The saddle-type electric vehicle according to claim 1, wherein an upper portion of the battery case is provided with an opening/closing cover.

12. The saddle-type electric vehicle according to claim 11, wherein a heat radiation hole is formed on a portion of the battery case, the portion facing the opening/closing cover.

13. The saddle-type electric vehicle according to claim 1, further comprising a diffusion fan located in the inner space of the battery case and diffusing air existing below the battery.

14. The saddle-type electric vehicle according to claim 1, wherein the electric component produces heat during vehicle traveling.

15. A saddle-type electric vehicle comprising:

a body frame having a head pipe supporting a steering shaft and a main frame portion extending rearward from the head pipe;

a battery case provided on the main frame portion behind the head pipe;

a battery stored in the battery case and supplying electric power to an electric motor generating traveling power;

a traveling wind path including an inner space of the battery case;

a seat arranged behind the battery case;

wherein a traveling wind inflow port allowing traveling wind to flow in the battery case from front is formed on an upper side of a front portion of the battery case, and a traveling wind outflow port allowing the traveling wind flowing in the battery case to flow out rearward is formed on an upper side of a rear portion of the battery case, wherein a traveling wind outlet discharging the traveling wind of the traveling wind path outside is arranged in an under seat space formed below the seat, and wherein the under seat space is formed by the seat having a reverse concave cross-section in a front view and a cover arranged below the seat and having a concave cross-section in the front view, and a size in a vehicle width direction of the cover is smaller than that of the seat, so that a clearance is formed between the seat and the cover.

16. The saddle-type electric vehicle according to claim 15, further comprising an air exhaust duct having a traveling wind communication port connected to the traveling wind outflow port, and the traveling wind outlet opening toward the under seat space, wherein the traveling wind path further includes an inner path of an air exhaust duct, and the air exhaust duct is arranged on a vehicle upper portion to extend in a forward and rearward direction in a side view.

17. A saddle-type electric vehicle comprising:

a body frame having a head pipe supporting a steering shaft and a main frame portion extending rearward from the head pipe;

a battery case provided on the main frame portion behind the head pipe;

a battery stored in the battery case and supplying electric power to an electric motor generating traveling power;

a traveling wind path including an inner space of the battery case;

a diffusion fan located in the inner space of the battery case and diffusing heat existing below the battery; and a blower fan allowing wind to flow outward from the battery case, wherein a traveling wind inflow port allowing traveling wind to flow in the battery case from front is formed on an upper side of a front portion of the battery case, and a traveling wind outflow port allowing the traveling wind flowing in the battery case to flow out rearward is formed on an upper side of a rear portion of the battery case.

* * * * *